United States Patent
Sonksen et al.

(10) Patent No.: US 7,565,580 B2
(45) Date of Patent: Jul. 21, 2009

(54) METHOD AND SYSTEM FOR TESTING NETWORK DEVICE LOGIC

(75) Inventors: Bradley S. Sonksen, Rancho Santa Margarita, CA (US); Aklank H. Shah, Ladera Ranch, CA (US); James M. Hamada, Jr., Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 972 days.

(21) Appl. No.: 11/201,036

(22) Filed: Aug. 10, 2005

(65) Prior Publication Data

US 2007/0036082 A1 Feb. 15, 2007

(51) Int. Cl.
*G06F 11/00* (2006.01)
(52) U.S. Cl. .......................... 714/44; 714/56
(58) Field of Classification Search ................ 714/44, 714/43, 56, 4–5, 9; 710/1, 5, 7, 15, 65, 313–315
See application file for complete search history.

(56) References Cited

U.S. PATENT DOCUMENTS

| | | | | |
|---|---|---|---|---|
| 5,905,744 A | * | 5/1999 | Reise et al. ................. | 714/821 |
| 6,379,274 B1 | * | 4/2002 | Robert ......................... | 474/19 |
| 6,587,813 B1 | * | 7/2003 | Whitt et al. ................. | 702/186 |
| 6,633,832 B1 | * | 10/2003 | Browen ....................... | 702/186 |
| 6,643,811 B1 | * | 11/2003 | Chambers .................... | 714/726 |
| 7,047,449 B2 | * | 5/2006 | Pfeifer et al. .................. | 714/41 |
| 2004/0071092 A1 | * | 4/2004 | Pfeifer et al. ................ | 370/248 |
| 2005/0235187 A1 | * | 10/2005 | Lai et al. ..................... | 714/733 |

* cited by examiner

*Primary Examiner*—Dieu-Minh Le
(74) *Attorney, Agent, or Firm*—Klein, O'Neill & Singh, LLP

(57) ABSTRACT

Method and system for testing a network device is provided. The system includes, a test program running on a host system that communicates with the network device through a bus functional module; and a test module that includes a packet counter that counts test packets that are received from a buffer and written in a memory of the test module; and an idle timer that counts time that has expired after a last test packet has been received by the memory module of the test module; wherein if the packet counter value exceeds a threshold value then all test packets residing in the memory of the test module are sent for testing network device logic and if the idle timer expires at any given instance, then all the test packets in the memory of the test module are sent for testing network device logic.

23 Claims, 7 Drawing Sheets

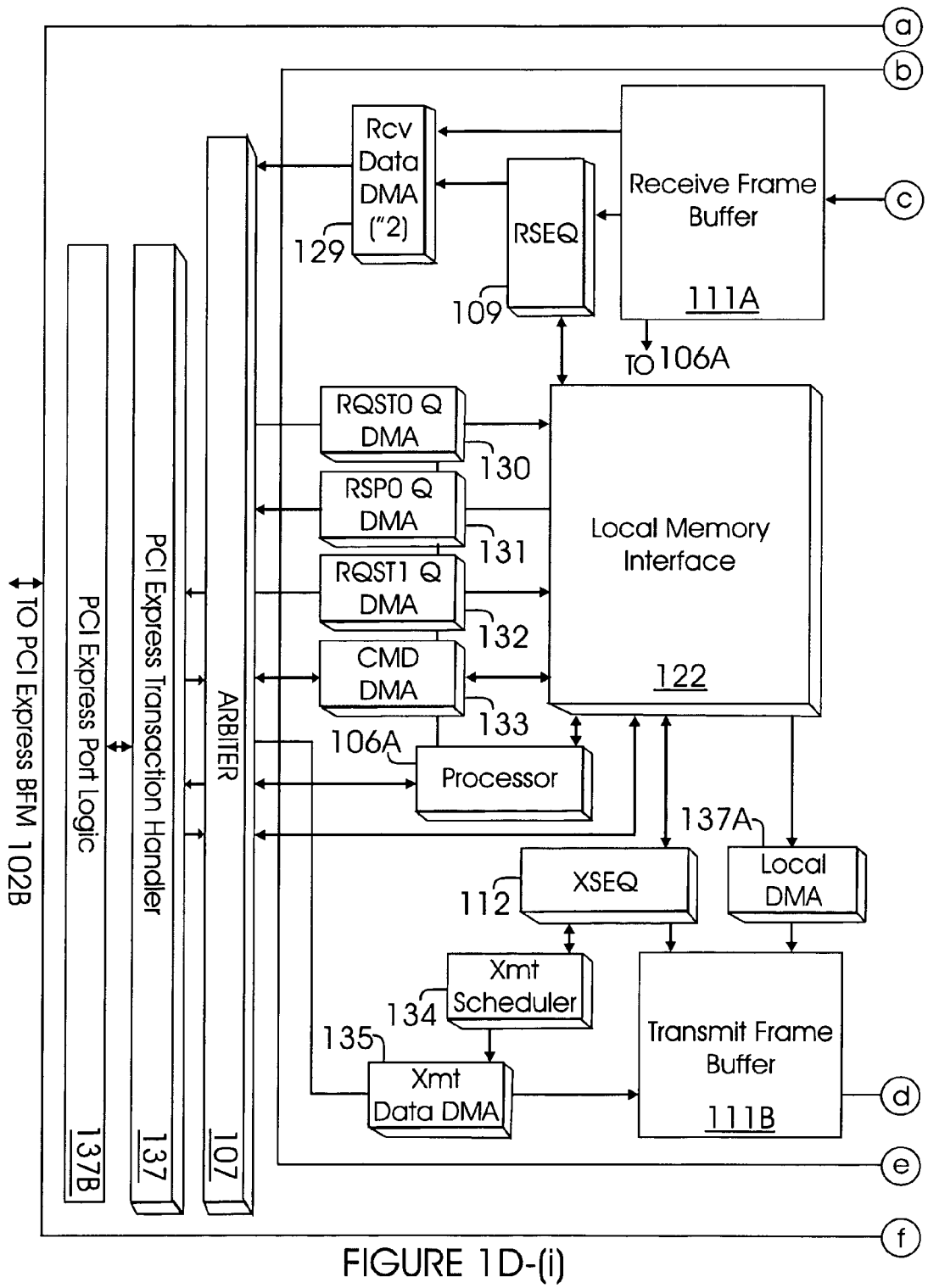
FIGURE 1D-(i)

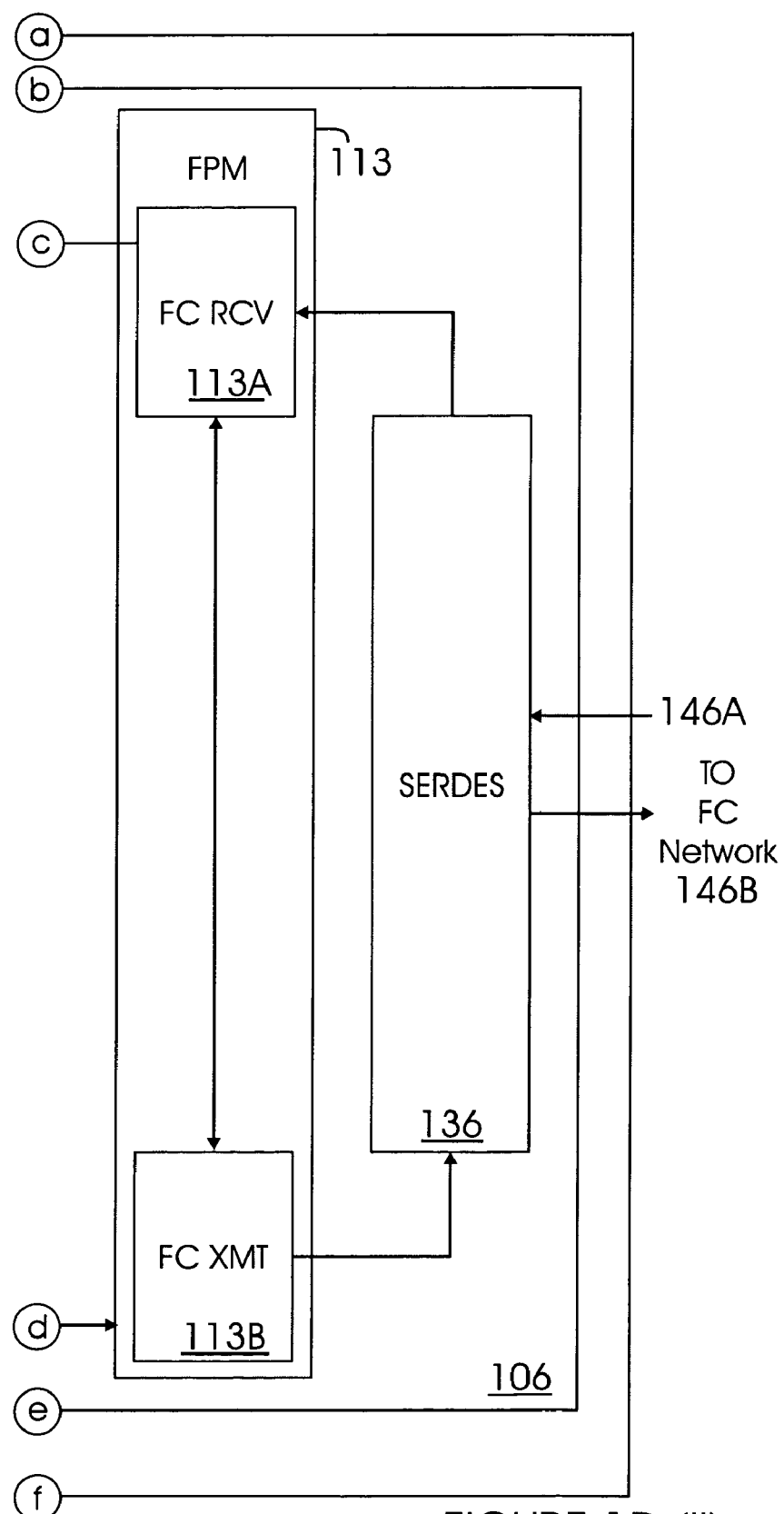
FIGURE 1D-(ii)

METHOD AND SYSTEM FOR TESTING NETWORK DEVICE LOGIC

BACKGROUND

1. Field of the Invention

The present invention relates to computing systems, and more particularly to testing PCI Express devices and/or other networking devices.

2. Background of the Invention

Computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host systems often communicate with peripheral devices via an interface such as the Peripheral Component Interconnect ("PCI") interface, a local bus standard using parallel data transfer that was developed by Intel Corporation®, or the extension of PCI known as PCI-X. More recently, PCI Express, a standard interface incorporating PCI transaction protocols at the logical level, but using serial data transfer at the physical level has been developed to offer better performance than PCI or PCI-X.

Host systems are used in various network applications, including TCP/IP networks, storage area networks ("SANs"), and various types of external device attachment. In SANs, plural storage devices are made available to various host computing systems. Data is typically moved between plural host systems and storage systems (or storage devices, used interchangeably throughout this specification). The connectivity between a host system and networks or external devices is provided by host bus adapters ("HBAs"), which plug into the host system. HBAs may attach to the host system via a standard interface such as PCI Express.

PCI Express HBAs receive serial data streams (bit streams), align the serial data and then convert it into parallel data for processing. PCI Express HBAs operate as transmitting devices as well as receiving devices.

PCI Express is an Input/Output ("I/O") bus standard (incorporated herein by reference in its entirety) that uses discrete logical layers to process inbound and outbound information. The logical layers are a Transaction Layer, a Data Link Layer ("DLL") and a Physical Layer ("PHY"). PCI-Express uses separate links to transmit and receive information.

PCI-Express uses a packet-based protocol to exchange information between Transaction layers. Transactions are carried out using Requests and Completions. The Transaction Layer assembles and disassembles Transaction Layer Packets ("TLPs"). TLPs are used to communicate transactions, such as read and write and other type of events.

Various other standard interfaces are also used to move data between host systems and peripheral devices. Fibre Channel is one such standard. Fibre Channel (incorporated herein by reference in its entirety) is an American National Standard Institute (ANSI) set of standards, which provides a serial transmission protocol for storage and network protocols.

PCI Express packets received on a link may come with little or no inter-packet gap. The packets need to be efficiently pipelined and processed to sustain high data throughput rates.

PCI Express devices in general and HBAs in particular are tested based on transactions using a bus functional model ("BFM"). The transactions need to be generated with minimum gap to test the logic. This is difficult to achieve in the PCI Express environment because of the overall PCI Express architecture as described below.

In the PCI Express environment, PCI Express port logic uses a store/forward buffer to move packets that are received from a host to a PCI Express Transaction Handler ("PTH"). PTH is a part of the logic that needs to be tested to handle different spacing between the TLPs. The store/forward buffer is used to store and validate entire packets before they are sent to the PTH. It becomes difficult to control test cases and to simulate internal boundary conditions in the PTH, especially when large packets follow small packets, since the large packets take longer to be released from the store/forward buffer.

Also, often TLPs are mixed with dynamic data link layer packets ("DLLPs"). When the DLLPs are stripped from the data path in the data link layer, the transactions that are left in the data path have bigger gaps. Hence, the PCI Express logic is not able to test all combinations of gaps between these packets efficiently.

It is noteworthy that the foregoing challenge for testing logic is also applicable to other input/output interfaces, similar to PCI Express devices.

Therefore, there is a need for a method and system for testing logic for a network device/PCI Express device.

SUMMARY OF THE INVENTION

In one aspect of the present invention, a test module for testing a network device is provided. The test module includes, a packet counter that counts test packets that are received from a buffer and written in a memory of the test module; and an idle timer that counts time that has expired after a last test packet has been received by the memory module of the test module; wherein if the packet counter value exceeds a threshold value then all test packets residing in the memory of the test module are sent for testing and if the idle timer expires at any given instance, then all the test packets in the memory of the test module are sent out for testing.

In another aspect of the present invention, a method for testing network device logic is provided. The method includes, receiving test packets; writing test packets in a memory module of a test module; incrementing a counter when a packet is written in the memory module; resetting an idle timer when a packet is written in the memory module; and unloading test packets from the memory module and sending the test packets, if the counter value exceeds a certain threshold value and/or the idle timer has expired.

In yet another aspect of the present invention, a system for testing a network device is provided. The system includes, a test program running on a host system that communicates with the network device through a bus functional module; and a test module that includes a packet counter that counts test packets that are received from a buffer and written in a memory of the test module; and an idle timer that counts time that has expired after a last test packet has been received by the memory module of the test module; wherein if the packet counter value exceeds a threshold value then all test packets residing in the memory of the test module are sent for testing network device logic and if the idle timer expires at any given instance, then all the test packets in the memory of the test module are sent for testing network device logic.

In another aspect of the present invention, a test module for testing PCI Express device logic is provided, wherein the test module is placed between a PCI Express Port Logic and PCI Express Transaction Handler ("PTH"). The test module includes, a packet counter that counts test packets that are received from a buffer in the PCI Express port logic and written in a memory of the test module; and an idle timer that counts time that has expired after a last test packet has been received by the memory module of the test module; wherein if the packet counter value exceeds a threshold value then all test packets residing in the memory of the test module are sent to the PTH for testing and if the idle timer expires at any given instance, then all the test packets in the memory of the test module are sent to the PTH.

In yet another aspect of the present invention, a method for testing PCI Express device logic is provided. The method includes, receiving test packets from a PCI Express port logic; writing test packets in a memory module of a test module that is placed between the PCI Express Port Logic and a PCI Express Transaction Handler (PTH); incrementing a counter when a packet is written in the memory module; resetting an idle timer when a packet is written in the memory module; and unloading test packets from the memory module and sending the test packets to the PTH, if the counter value exceeds a certain threshold value and/or the idle timer has expired.

In another aspect of the present invention, a system for testing a PCI Express device logic with a PCI Express Port Logic and a PCI Express Transaction Handler ("PTH") is provided. The system includes a test program running on a host system that communicates with the PCI Express device through a bus functional module; and a test module that is placed between the PCI Express Port logic and the PTH and includes a packet counter that counts test packets that are received from a buffer in the PCI Express port logic and written in a memory of the test module; and an idle timer that counts time that has expired after a last test packet has been received by the memory module of the test module; wherein if the packet counter value exceeds a threshold value then all test packets residing in the memory of the test module are sent to the PTH for testing and if the idle timer expires at any given instance, then all the test packets in the memory of the test module are sent to the PTH.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1D shows a block diagram of a HBA;

DETAILED DESCRIPTION OF THE PREFERRED EMBODIMENTS

To facilitate an understanding of the preferred embodiment, the general architecture and operation of a HBA (a network/PCI Express device, used interchangeably throughout this specification) will be described. The specific architecture and operation of the preferred embodiment will then be described with reference to the general architecture of the host system and HBA.

Figure 1A:
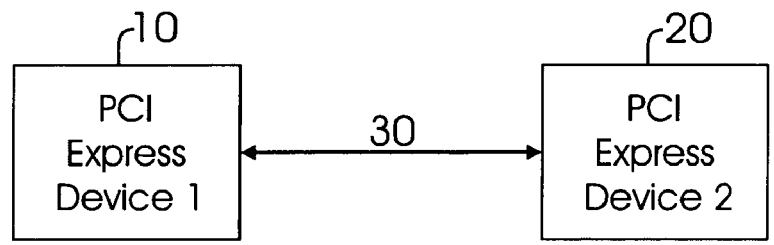
FIG. 1A shows an example of two PCI Express/network devices communicating with each other.
Figure 1B:
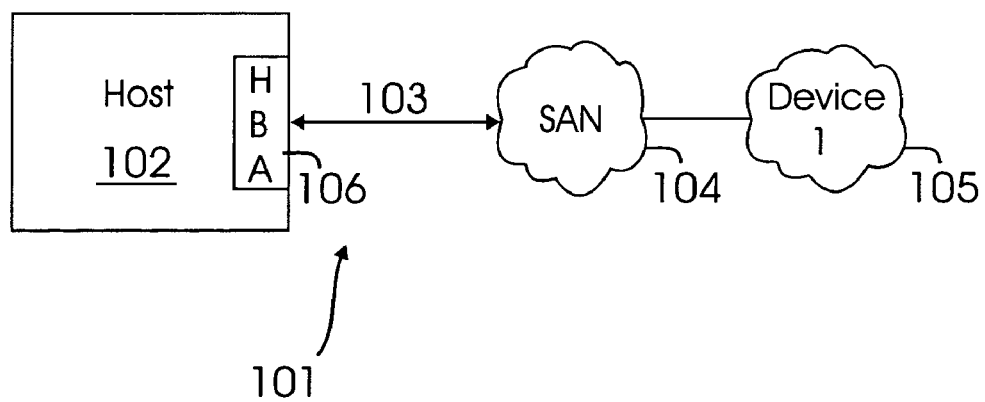
FIG. 1B shows a HBA being used as a PCI Express Device.

System Overview:

FIG. 1A shows two PCI Express devices (or any other network devices, used interchangeably throughout this specification) 10 and 20 communicating via network link 30 (or any other link). PCI express devices may interface with a host system of or a storage system. FIG. 1B shows a block diagram of a system 101 where a host computing system 102 is coupled to a storage device 105 via a SAN 104 (via connection 103). HBA 106 facilitates data transfer between host 102 and device 105.

Figure 1C:
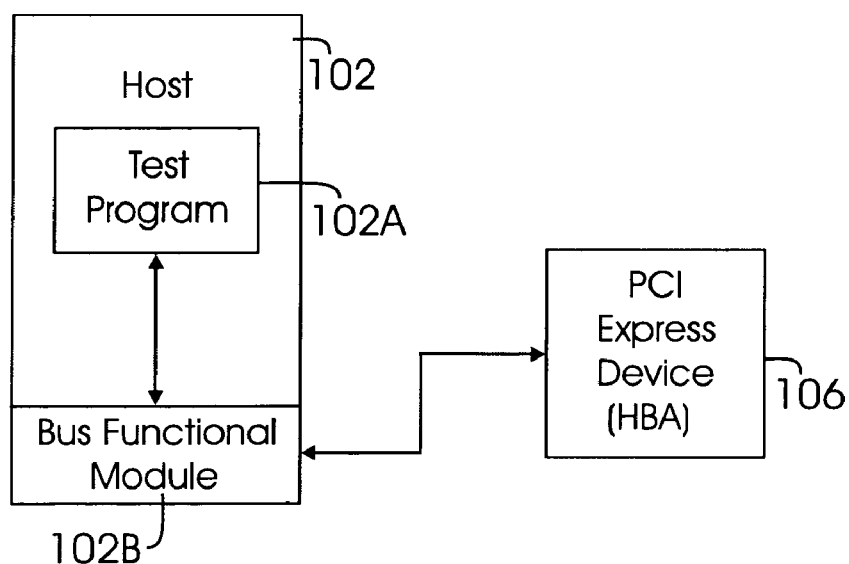
FIG. 1C shows a system for testing a network device/PCI Express device.

FIG. 1C shows a system for testing HBA 106 (or any other device) using a test program 102A running on the host system 102. Test program 102A interfaces with HBA 106 through a Bus Functional Module ("BFM") layer 102B. Host system 102 can be a general-purpose computer with a processor to execute computer code/program.

HBA 106:

FIG. 1D shows a block diagram of adapter 106. Adapter 106 includes processors (may also be referred to as "sequencers") "XSEQ" 112 and "RSEQ" 109 for receive and transmit side, respectively for processing data received from storage sub-systems and transmitting data to storage sub-systems. Transmit path in this context means data path from the host system to the network (146B) via adapter 106. Receive path means data path from the network (146A) to the host system via adapter 106. Buffers 111A and 111B are used to store information in receive and transmit paths, respectively.

Beside dedicated processors on the receive and transmit path, adapter 106 also includes processor 106A, which may be a reduced instruction set computer ("RISC") for performing various functions in adapter 106.

Adapter 106 also includes fibre channel interface (also referred to as fibre channel protocol manager "FPM") 113 that includes modules 113A and 113B in receive and transmit paths, respectively (shown as "FC RCV" and "FC XMT"). Modules 113A and 113B allow data to move to/from storage systems.

Adapter 106 is also coupled to an external memory (not shown) and local memory interface 122. Memory interface 122 is provided for managing local memory (not shown). Local DMA module 137A is used for gaining access to move data from the local memory.

Adapter 106 also includes a serial/de-serializer 136 for converting data from 10-bit to 8-bit format and vice-versa.

Adapter 106 also includes request queue DMA channel (0) 130, response queue DMA channel 131, request queue (1)

DMA channel 132 that interface with a request queue and response queue in host memory (not shown); and a command DMA channel 133 for managing command information. DMA channels are coupled to arbiter 107 that receives requests and grants access to a certain channel.

Both receive and transmit paths have DMA modules 129 and 135 that are used to gain access to a channel for data transfer in the receive/transmit paths. Transmit path also has a scheduler 134 that is coupled to processor 112 and schedules transmit operations.

A host processor (not shown) sets up shared data structures in buffer memory (not shown). A host command is stored in the local memory and the appropriate sequencer (i.e., 109 or 112) is initialized to execute the command.

Various DMA units (or channels, used interchangeably throughout this specification) (for example, 129, 130, 131, 132, 133 and 135) send a request to arbiter 107. When a request is granted, the DMA unit is informed of the grant and memory access is granted to a particular channel.

Arbiter 107 is coupled to a PCI-Express Transaction Handler (PTH) 137. PTH 137 is coupled to PCI-Express port logic 137B that moves information to/from a host system. PTH 137 has also been referred to as PCI-Express interface and includes a receive side and transmit side link that allows communication between the host system and the Fibre Channel network (146A and 146B) via adapter 106.

Figure 2:
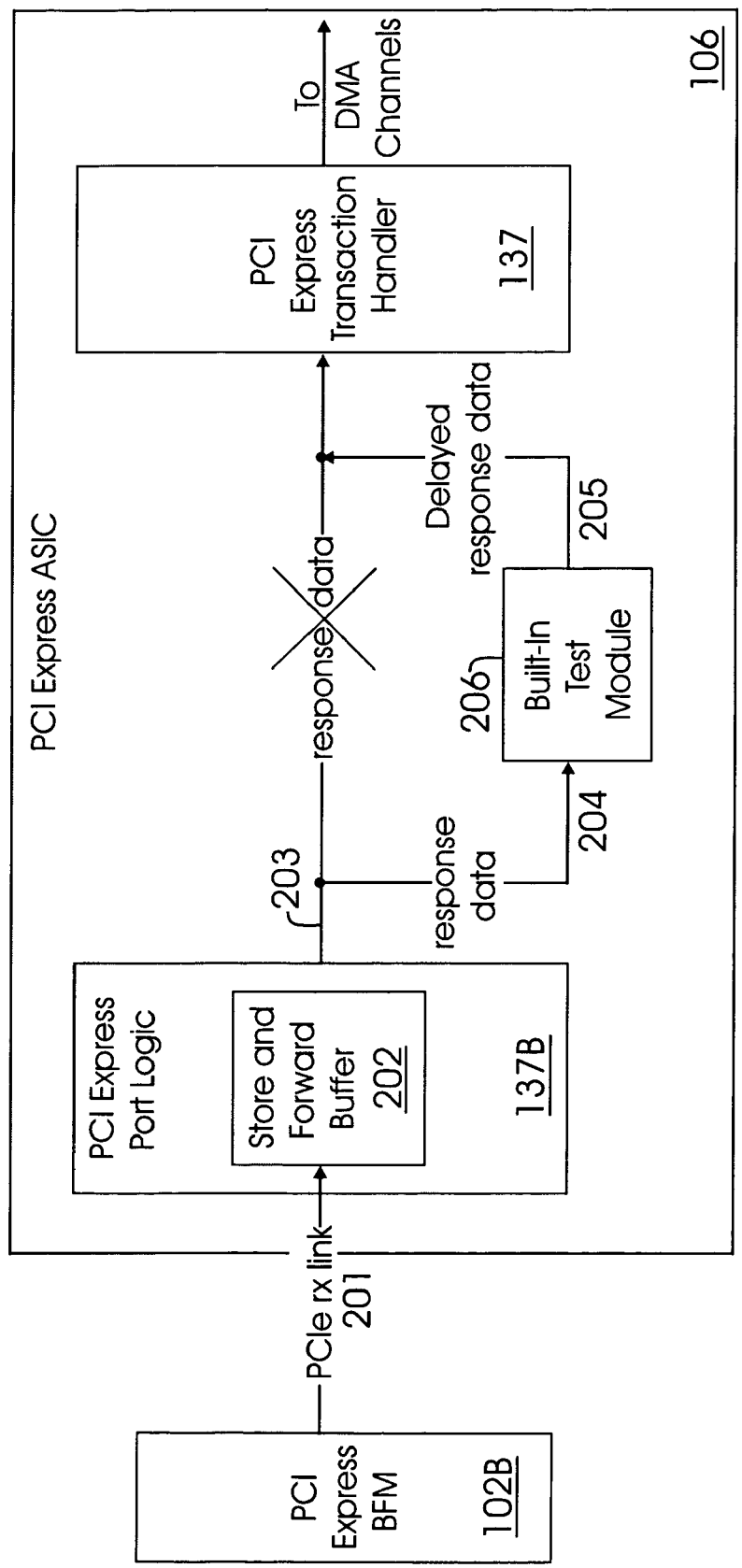
FIG. 2 shows a block diagram of PCI Express device with a test module, according to one aspect of the present invention.

Built in Test Module 206:

FIG. 2 shows a generic diagram of a PCI Express application specific integrated circuit (for example, HBA 106) (or an ASIC for any other network device) with a built in test module 206 for efficiently and accurately testing the various logic and hardware components of the PCI Express device (for example, PTH 137).

BFM 102B running on the host system (FIG. 1C) sends PCI Express test packets via PCI express link 201. The test packets are stored in a memory buffer 202 that is located in the PCI Express Port Logic 137B. Data movement from buffer 202 to PTH 137 is controlled by built in test module (may also be referred to as "module") 206. Module 206 alters the input/output timing of buffer 202 so that transactions that enter PTH 137 have minimum spacing. This allows the test program 102A to thoroughly test the logic in PTH 137. Packets from buffer 202 for simulation only are moved to module 206 (shown as 204) instead of going directly to PTH 137 via path 203. Module 206 sends test packets to PTH 137 via path 205 as described below.

Figure 5:
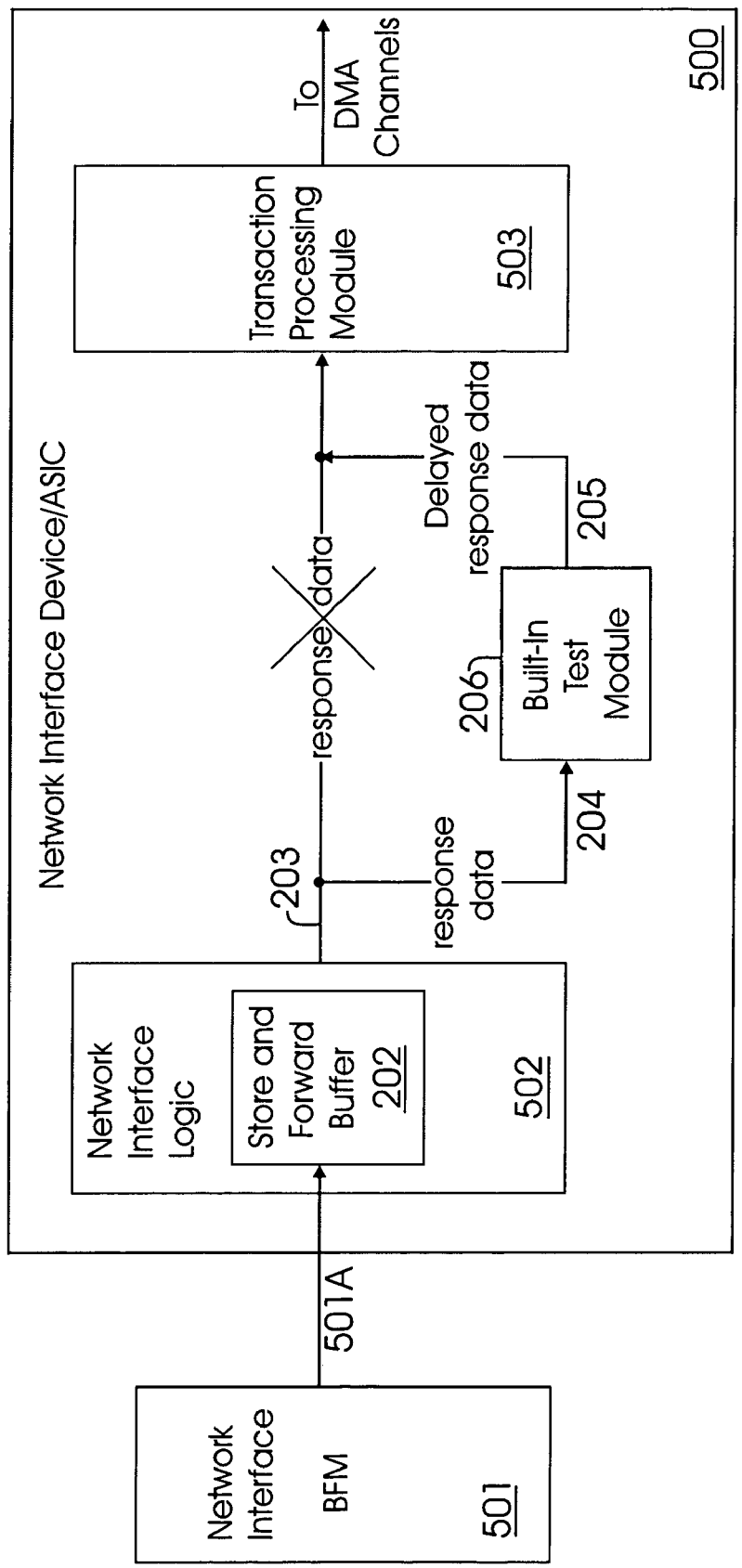
FIG. 5 shows a block diagram of a generic network system that can use the test module according to one aspect of the present invention.

FIG. 5 shows a block diagram of a network interface device/ASIC 500 with test module 206 used for testing various components. In system 500, packets 501A are received from a network interface bus functional module 501. Module 501 runs on the host system (FIG. 1C) and sends test packets via link 501A. The test packets are stored in a memory buffer 202 located in network interface logic 502. Data movement from buffer 202 to transaction processing module 503 (referred to as module 503) is controlled by test module 206 that is described below with respect to FIG. 3. Module 206 alters the input/output timing of buffer 202 so that transactions that enter module 503 have minimum spacing. This allows the test program 102A to thoroughly test the logic in module 503. Packets from buffer 202 for simulation only are moved to module 206 (shown as 204) instead of going directly to module 503 via path 203. Module 206 sends test packets to module 503 via path 205.

Figure 3:
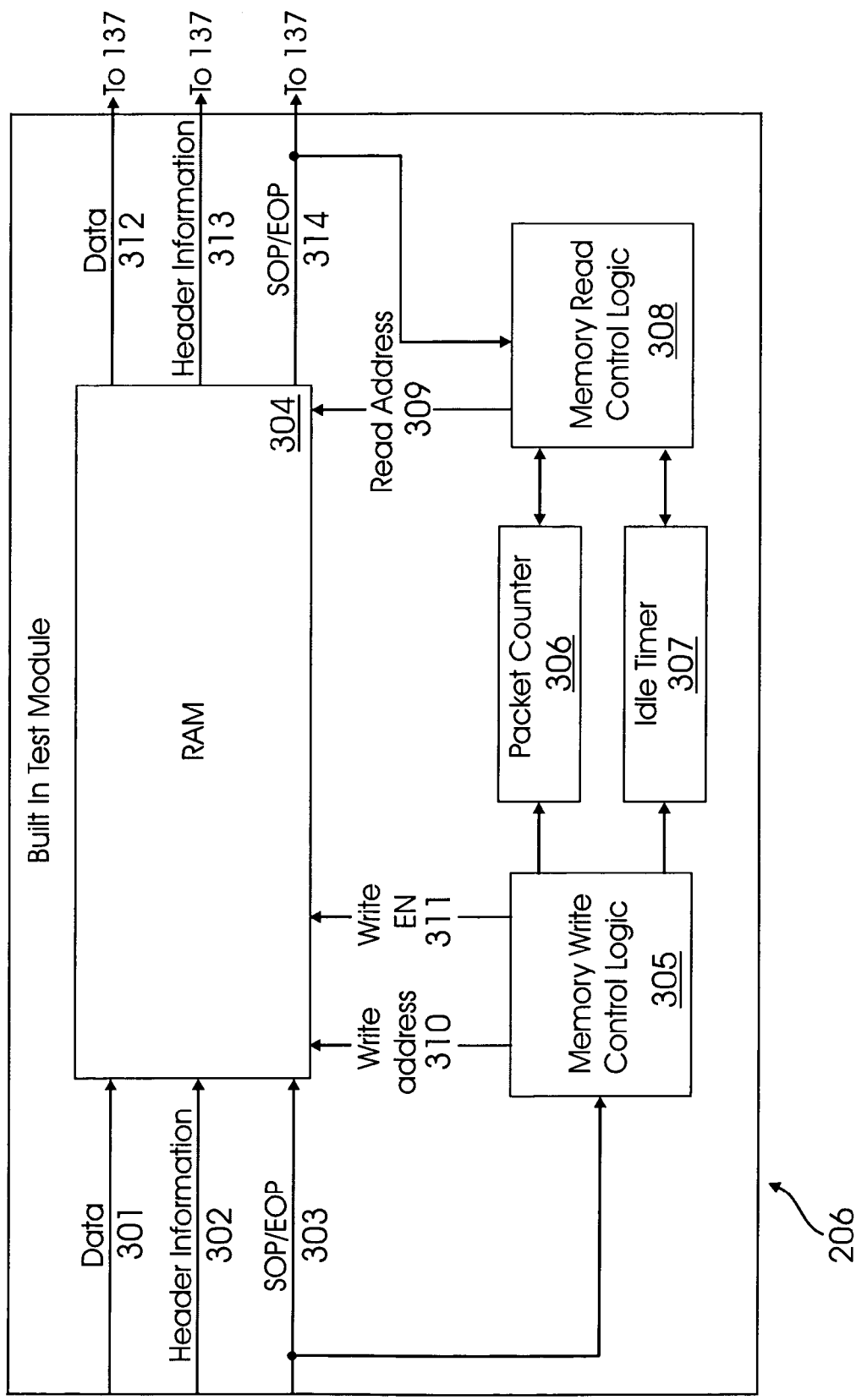
FIG. 3 shows a block diagram of the test module of FIG. 2.

FIG. 3 shows a block diagram of module 206 that is used for sending the optimum number of test packets so that PTH 137 logic (or module 503, used interchangeably throughout this specification) can be thoroughly tested and the PTH 137 does not stay idle beyond a pre-determined period. Turning in detail to FIG. 3, Data 301, header information 302 and start of packet (SOP)/end of packet (EOP) 303 are received from buffer 202 and then stored in memory 304. Memory 304 may be random access memory.

Module 206 uses a memory write control logic module 305 (may also be referred to as "logic" 305) that controls what is written in memory 304. The write process begins when a SOP (303) is detected and continues until an EOP (303) is detected. Data is written in memory 304 on each clock cycle. The write process is enabled by signal (or command, used interchangeably throughout this specification) 311. The write address (i.e. where data is written in memory 304) is sent to memory 304 via signal 310 based on SOP/EOP 303.

Memory read control logic 308 (may also be referred to as "Logic" 308) controls what is sent from memory 304 to PTH 137. Logic 308 provides read address 309 so that data 312, header 313 and SOP/EOP 314 can be sent to PTH 137 for testing. An optimum number of packets are sent so that PTH 137 is thoroughly tested and also starvation conditions (i.e. idle condition when PTH 137 does not have any packets to process) are minimized.

A packet counter 306 and an idle timer module 307 are provided between write logic 305 and read logic 308 so that an optimum number of packets are sent to PTH 137 to maximize length of packet bursts. Counter 306 counts the number of packets in memory 304 at any given time. If the number of packets in memory 304 matches a threshold value (i.e. greater, equal to or less than), then all the packets in memory 304 are released and sent to PTH 137.

Idle timer module 307 (may also be referred to as Idle Timer 307) is used so that PTH 137 does not stay idle beyond a certain period, waiting for packets. Idle timer module 307 monitors the time that has expired since a last packet is written in memory 304. If the Idle timer 307 has reached a certain value (or has expired) then packets from memory 304 are unloaded and sent to PTH 137.

Counter 306 and idle timer 307 optimize the simulation/testing process. While counter 306 allows packets to accumulate so that PTH 137 can be tested for back-to-back condition (when packets are sent back-to-back), idle timer module 307 ensures that PTH 137 does not stay idle beyond a certain threshold value and cause a transaction to stall indefinitely.

When counter 306 reaches a certain threshold value, for example, 8 or more packets, then read logic 308 generates the read addresses 309 and packets are released from memory 304 and sent to PTH 137. In this case the entire memory content 304 (for example, all the 8 packets) are released so that a sequence of X number (for example, 8) of packets are sent without any delay, hence, creating a sequence of back-to-back packets. This ensures that certain boundary conditions in PTH 137 are tested thoroughly.

If the counter 306 is less than the threshold value, but the idle timer 307 exceeds a certain threshold value (for example, 1 microsecond), then the entire memory 304 contents is released and sent to PTH 137. This avoids starvation conditions for PTH 137.

The following provides an example of how counter 306 and idle timer 307 operate together:
Number of packets in memory 304 at any given instance "T": 6
Threshold value for Counter 306: 8 or more packets
Idle Timer value: 1.1 milliseconds
Idle Timer Threshold value: 1.00 or greater milliseconds
Result: The 6 packets from memory 304 are sent to PTH 137 because the Idle Timer has expired.

It is noteworthy that the time out values for counter 306 and idle timer module 307 can be programmed and can vary. The adaptive aspects of the present invention are not limited to any particular threshold value.

Figure 4:
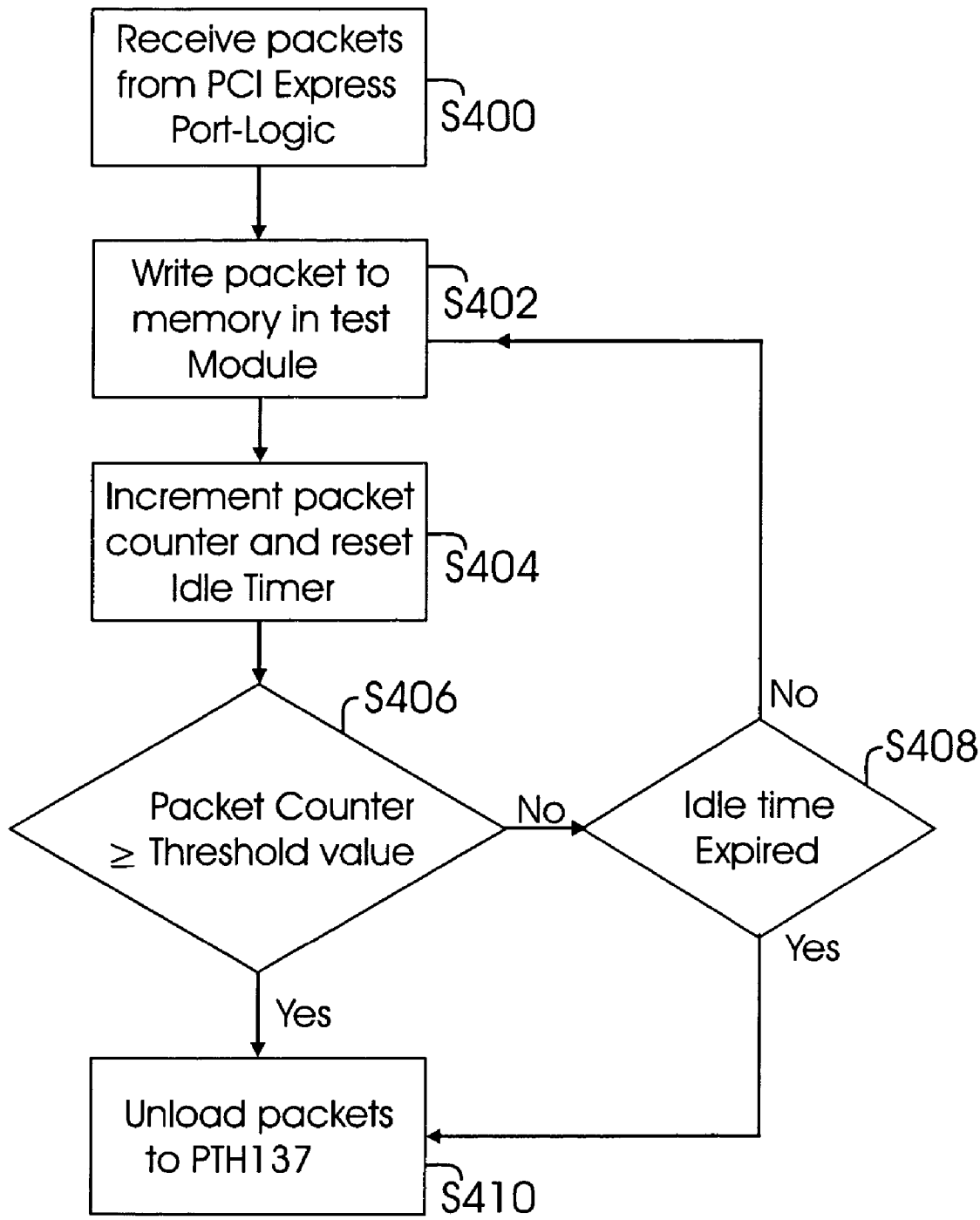
FIG. 4 shows a process flow diagram for using the test module, according to one aspect of the present invention.

Process Flow:

FIG. 4 shows a flow diagram for using module 206, according to one aspect of the present invention to improve and optimize simulation/testing of PCI Express devices (or any other network device). Turning in detail to FIG. 4, in step S400, data 301, header 302 and/or SOP/EOP 303 are received by memory 304 from PCI Express Port Logic 137B (namely memory 202).

In step S402, logic 305 generates write address 310 and information received from PCI express port logic 137B is written in memory buffer 304.

In step S404, counter 306 is incremented, which denotes that a packet has been written in memory 304. The idle timer 307 is also reset so that the timer can count the time elapsed since a last packet is written in memory 304.

In step S406, the process determines if packet counter 306 value is greater or equal to a threshold value (for example, 8 as discussed above). If the counter 306 value is greater or equal to the threshold value, then the packets stored in memory 304 are read and in step s410, packets are sent to PTH 137.

If the packet counter 306 value is below the threshold, the process determines in step S408, if idle timer 307 has expired. If the idle timer has expired, then the number of packets at that instance are read and sent to PTH 137.

If the idle timer has not expired in step S408, then the process reverts back to step S402, where more packets are written and the process continues. It is noteworthy that if idle timer expires at any given instance, the packets are sent to PTH 137 for testing.

In one aspect of the present invention, the use of counter 306 and idle timer 307 ensures back-to-back packet condition testing and also avoids starvation conditions for PTH 137. Hence, the PTH 137 logic is efficiently and accurately simulated/tested.

It is noteworthy that although the foregoing example use a PCI express device, the adaptive aspects of the present invention can be used to test the logic for other devices, including other network devices that contain store/forward buffer and handle non-data traffic. For example, another (non-PCI Express device as shown in FIG. 5) network device may use a store/forward buffer and has other link characteristics that can result in "internal" packet gaps to be different from the gaps that are seen at an external interface. In such a situation, the system described above with respect to FIGS. 2-5 can be used to efficiently test the logic.

Although the present invention has been described with reference to specific embodiments, these embodiments are illustrative only and not limiting. Many other applications and embodiments of the present invention will be apparent in light of this disclosure and the following claims.

What is claimed is:

1. A test module for testing PCI Express device logic, wherein the test module is placed between a PCI Express Port Logic and PCI Express Transaction Handler ("PTH") comprising:

a packet counter that counts test packets that are received from a buffer in the PCI Express port logic and written in a memory of the test module; and an idle timer that counts time that has expired after a last test packet has been received by the memory module of the test module; wherein if the packet counter value exceeds a threshold value then all test packets residing in the memory of the test module are sent to the PTH for testing and if the idle timer expires at any given instance, then all the test packets in the memory of the test module are sent to the PTH.

2. The test module of claim 1, wherein a write control logic controls what is written in the memory of the test module.

3. The test module of claim 1, wherein a read control logic controls what is read from the memory of the test module based on whether a packet counter value and/or idle timer expiration.

4. The test module of claim 1, wherein the PCI Express device is a host bus adapter.

5. A method for testing PCI Express device logic, comprising:

receiving test packets from a PCI Express port logic;

writing test packets in a memory module of a test module that is placed between the PCI Express Port Logic and a PCI Express Transaction Handler (PTH);

incrementing a counter when a packet is written in the memory module;

resetting an idle timer when a packet is written in the memory module; and unloading test packets from the memory module and sending the test packets to the PTH, if the counter value exceeds a certain threshold value and/or the idle timer has expired.

6. The method of claim 5, wherein a write control logic controls what is written in the memory module of the test module.

7. The method of claim 5, wherein a read control logic controls what is read from the memory module of the test module based on whether a counter value has exceeded a threshold value and/or if the idle timer has expired.

8. The test module of claim 5, wherein the PCI Express device is a host bus adapter.

9. A system for testing a PCI Express device logic with a PCI Express Port Logic and a PCI Express Transaction Handler ("PTH") comprising:

a test program running on a host system that communicates with the PCI Express device through a bus functional module; and a test module that is placed between the PCI Express Port logic and the PTH and includes a packet counter that counts test packets that are received from a buffer in the PCI Express port logic and written in a memory of the test module;

and an idle timer that counts time that has expired after a last test packet has been received by the memory module of the test module; wherein if the packet counter value exceeds a threshold value then all test packets residing in the memory of the test module are sent to the PTH for testing and if the idle timer expires at any given instance, then all the test packets in the memory of the test module are sent to the PTH.

10. The system of claim 9, wherein a write control logic controls what is written in the memory of the test module.

11. The system of claim 9, wherein a read control logic controls what is read from the memory of the test module based on whether a packet counter value and/or idle timer expiration.

12. The system of claim 9, wherein the PCI Express device is a host bus adapter.

13. A test module for testing a network device, comprising:

a packet counter that counts test packets that are received from a buffer and written in a memory of the test module; and an idle timer that counts time that has expired after a last test packet has been received by the memory module of the test module; wherein if the packet counter value exceeds a threshold value then all test packets residing in the memory of the test module are sent for testing and if the idle timer expires at any given instance, then all the test packets in the memory of the test module are sent out for testing.

14. The test module of claim 13, wherein a write control logic controls what is written in the memory of the test module.

15. The test module of claim 13, wherein a read control logic controls what is read from the memory of the test module based on whether a packet counter value and/or idle timer expiration.

16. The test module of claim 13, wherein the network device is a host bus adapter.

17. The test module of 13, wherein the network device is a PCI Express device and/or a non-PCI Express device.

18. A method for testing a network device logic, comprising:
    receiving test packets;
    writing test packets in a memory module of a test module;
    incrementing a counter when a packet is written in the memory module;
    resetting an idle timer when a packet is written in the memory module; and
    unloading test packets from the memory module and sending the test packets, if the counter value exceeds a certain threshold value and/or the idle timer has expired.

19. The method of claim 18, wherein a write control logic controls what is written in the memory module of the test module.

20. The method of claim 18, wherein a read control logic controls what is read from the memory module of the test module based on whether a counter value has exceed a threshold value and/or if the idle timer has expired.

21. A system for testing a network device comprising:
    a test program running on a host system that communicates with the network device through a bus functional module; and
    a test module that includes a packet counter that counts test packets that are received from a buffer and written in a memory of the test module; and an idle timer that counts time that has expired after a last test packet has been received by the memory module of the test module; wherein if the packet counter value exceeds a threshold value then all test packets residing in the memory of the test module are sent for testing network device logic and if the idle timer expires at any given instance, then all the test packets in the memory of the test module are sent for testing network device logic.

22. The system of claim 21, wherein a write control logic controls what is written in the memory of the test module.

23. The system of claim 9, wherein a read control logic controls what is read from the memory of the test module based on whether a packet counter value and/or idle timer expiration.

* * * * *

UNITED STATES PATENT AND TRADEMARK OFFICE
CERTIFICATE OF CORRECTION

| | | |
|---|---|---|
| PATENT NO. | : 7,565,580 B2 | Page 1 of 1 |
| APPLICATION NO. | : 11/201036 | |
| DATED | : July 21, 2009 | |
| INVENTOR(S) | : Bradley S. Sonksen et al. | |

It is certified that error appears in the above-identified patent and that said Letters Patent is hereby corrected as shown below:

In the Specifications:

In column 4, line 64, delete "serial/de-serializer" and insert -- serializer/de-serializer --, therefor.

In the Claims:

In column 9, line 18, in claim 17, before "13," insert -- claim --.

In column 10, line 6, in claim 20, delete "exceed" and insert -- exceeded --, therefor.

In column 10, line 25, in claim 23, delete "claim 9," and insert -- claim 21, --, therefor.

Signed and Sealed this

Twelfth Day of October, 2010

David J. Kappos
*Director of the United States Patent and Trademark Office*